(12) United States Patent
Ogle

(10) Patent No.: US 10,809,113 B2
(45) Date of Patent: Oct. 20, 2020

(54) APPARATUS FOR REMOVING WETNESS FROM A GAUGE STICK

(71) Applicant: Ragless LLC, Mesquite, TX (US)

(72) Inventor: Michael W Ogle, Mesquite, TX (US)

( * ) Notice: Subject to any disclaimer, the term of this patent is extended or adjusted under 35 U.S.C. 154(b) by 96 days.

(21) Appl. No.: 16/230,533

(22) Filed: Dec. 21, 2018

(65) Prior Publication Data

US 2019/0195673 A1     Jun. 27, 2019

Related U.S. Application Data

(60) Provisional application No. 62/608,712, filed on Dec. 21, 2017.

(51) Int. Cl.
*G01F 23/04*     (2006.01)
(52) U.S. Cl.
CPC ................... *G01F 23/045* (2013.01)
(58) Field of Classification Search
CPC ........ G01F 23/045; G01F 23/04; G01F 15/12; E21B 33/08; F16L 2101/12; A47L 25/00; F01M 11/12
See application file for complete search history.

(56) References Cited

U.S. PATENT DOCUMENTS

| 1,985,334 A | * | 12/1934 | Benroth | G01F 23/045 |
| | | | | 33/725 |
| 3,591,886 A | * | 7/1971 | Denver | G01F 23/04 |
| | | | | 15/220.4 |
| 4,891,859 A | * | 1/1990 | Tremblay | G01F 23/045 |
| | | | | 15/104.8 |
| 2011/0247230 A1 | * | 10/2011 | Goldstein | G01F 23/045 |
| | | | | 33/725 |

* cited by examiner

*Primary Examiner* — Robert J Scruggs
(74) *Attorney, Agent, or Firm* — Aaron P. Peacock; Gagnon, Peacock & Vereeke P.C.

(57) ABSTRACT

An apparatus for removing wetness from a gauge stick comprising a housing capable of receiving a gauge stick, a wiper receiver that forms a wiper receiver cavity therein and that engages with the housing, and a wiper that fits into the wiper receiver cavity formed by the wiper receiver and that forms a wiper aperture for slidably engaging a gauge stick.

12 Claims, 7 Drawing Sheets

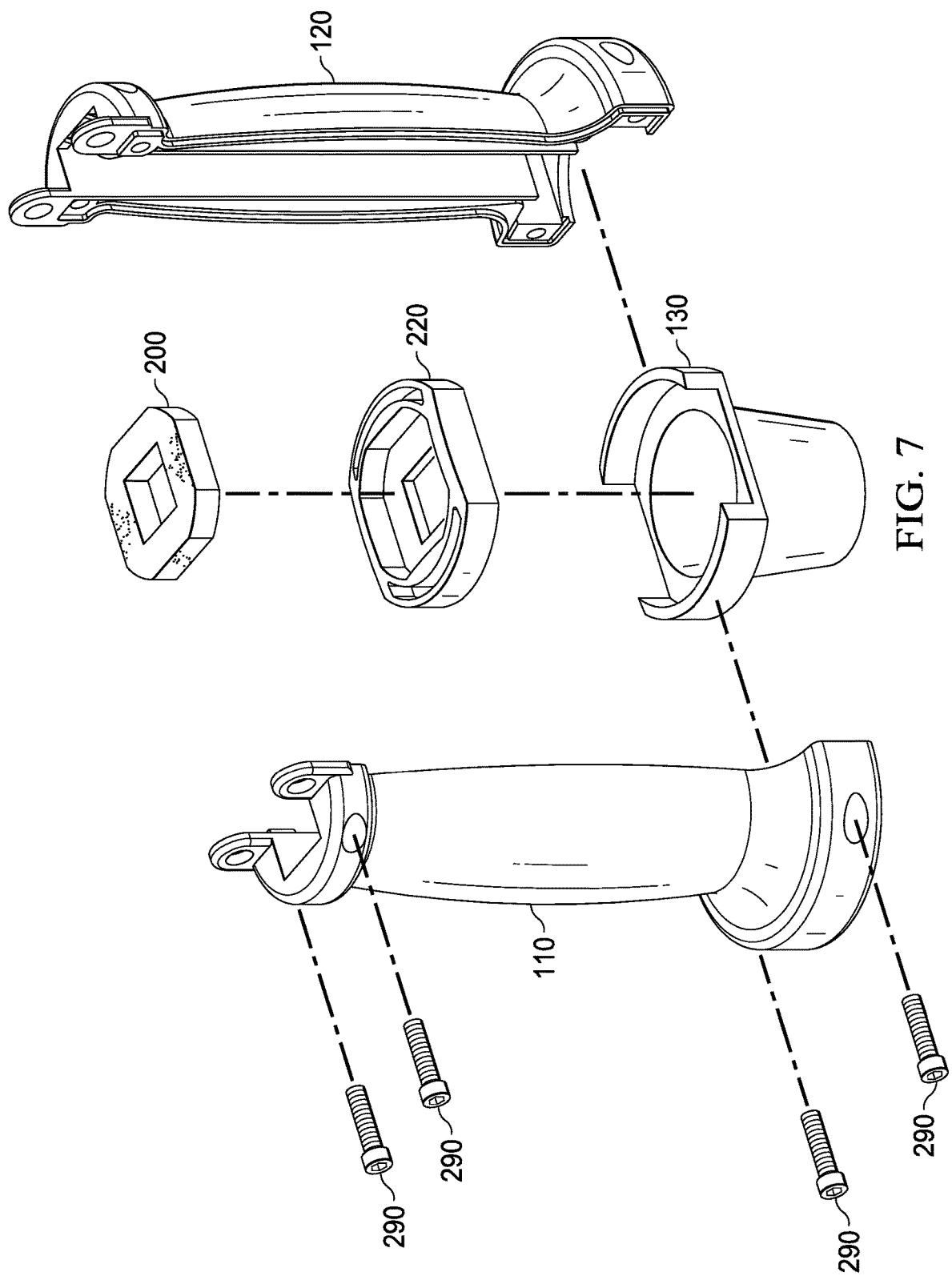

APPARATUS FOR REMOVING WETNESS FROM A GAUGE STICK

CROSS-REFERENCE TO RELATED APPLICATION(S)

Applicant claims priority to U.S. Provisional Patent Application No. 62/608,712, filed Dec. 21, 2017, the disclosure of which is incorporated by reference herein in its entirety.

DESCRIPTION OF THE DRAWINGS

FIG. 7 is an exploded perspective view of the apparatus of FIG. 1;

BACKGROUND OF THE INVENTION

Figure 1:
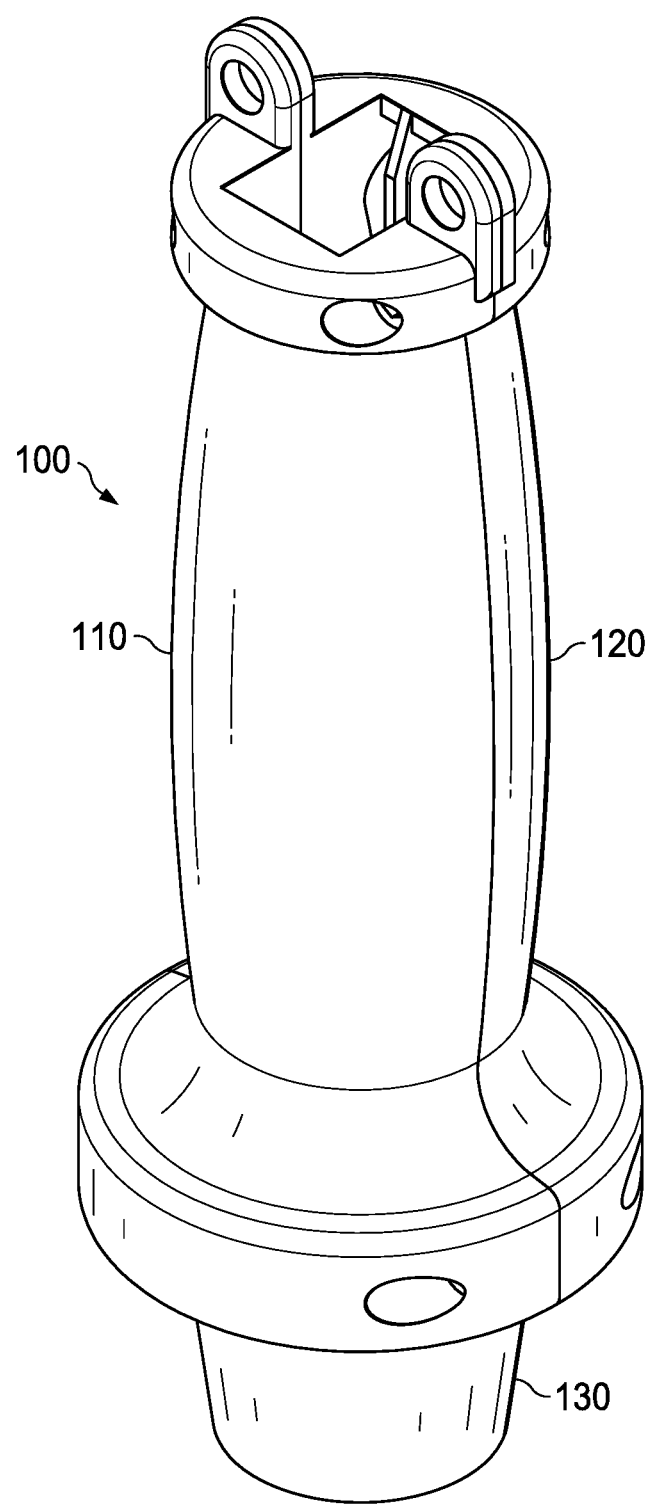
FIG. 1 is a perspective view of an apparatus for removing wetness from a gauge stick, comprising an embodiment of the present invention.

Measuring the quantity of fluid in a particular receptacle has been known and conducted for centuries. While technology has improved through the centuries as well as an understanding and application of mathematics, the tools and processes utilized in measuring the quantity of fluid in a receptacle has not markedly changed. One such tool is the gauge stick, which has been and continues to be a mainstay in the art of gauging.

To measure the amount of fluid within a receptacle, typically a gauge stick, which is usually a rod or pole that is made of hardwood, fiberglass or the like, is inserted into the receptacle. Numbers or marks are ordinarily embossed along the side of the gauge stick to aid in the measuring. After inserting the gauge stick into the receptacle, it is withdrawn and the extent of the wetness on the surface of the gauge stick is observed, including the height of the wetness on the gauge stick and to which number or mark on the gauge stick the wetness finally extends. Occasionally thereafter—depending on the circumstances—mapping can be performed via a conversion chart or the like to convert the maximum wetted number or mark indicated on the gauge stick to the desired unit of measurement, thereby providing the total amount of fluid within that particular receptacle in the desired unit of measurement.

Typically, after the wetness on the gauge stick has been observed and the gauge stick is withdrawn or is being withdrawn from the receptacle, a rag or the like is used to remove the wetness/residue from the gauge stick. Thus, a rag or like material will be placed around the gauge stick in and around the area that comprises the wetness/residue to wipe the wetness/residue from the gauge stick. In so doing, fluid is transferred from the receptacle to the gauge stick where it is noted herein as wetness or residue and then from the gauge stick to a rag or like material. Depending upon the length of the gauge stick, including the area along the gauge stick that is wet, one or more rags or like material may be required to wipe the gauge stick and remove the wetness/residue.

Use of gauge sticks for measuring fluid in receptacles is commonplace in a broad swath of industries. Gauge sticks, also known as dipsticks, are used in the automotive industry to measure the depth of liquid in an engine. While used extensively in many industries, however, the use of gauge sticks and the act of gauging is prevalent in the petroleum industry.

In the petroleum industry, gauge sticks are often utilized to determine the amount of petroleum or other similar fluid that is present within a tank or to determine the flow rate that is occurring within a tank. To determine a flow rate of petroleum or of other similar fluid, sometimes gauging of a tank must occur periodically on a nearly on-going basis, such as a period of every few minutes. Further, color cutting is performed, which occurs when paste is applied to a gauge stick and gauging is then performed, resulting in the paste on the gauge stick changing color to provide information about the fluid within the tank. Consequently, gauging and the use of gauge sticks are vital to the petroleum industry. However, the current use of gauge sticks and the act of gauging has many drawbacks, especially when used in connection with hazardous fluids/materials that are found in the petroleum industry.

When a gauge stick is withdrawn from a receptacle, residue/wetness remains on the portion of the surface area of the gauge stick that was submerged in the fluid. The residue/wetness is usually wiped and, thus, removed from the gauge stick, however if the fluid is a hazardous material, such as is found in the petroleum industry, then the residue/wetness must be removed/wiped from the gauge stick, so that the user of the gauge stick and others, as well as the environment, are not harmed by the fluid, the wetness/residue of the fluid on the gauge stick or the vapors produced by the fluid and so that compliance with rule(s), regulation(s) and law(s) requiring proper disposal of such hazardous material are performed.

Usually a rag or like material is used to wipe and remove such residue/wetness from the gauge stick. As such, the residue/wetness on the gauge stick is transferred to the rag. Then, the rag must be discarded. However, if the residue/wetness is of a hazardous material, then typically the rag must be discarded according to proper protocols—usually dictated by rules, regulations or laws. This process of discarding soiled rags, especially rags soiled with a hazardous material, increases overhead costs, financial costs and other costs.

Furthermore, procuring the rags or like material and keeping them on hand to wipe gauge sticks increases financial costs as well, and depending on the length of the gauge stick and the surface area on the gauge stick from which residue/wetness must be wiped, multiple rags may be needed per gauge stick use. Also, utilizing rags to wipe and remove residue/wetness can jeopardize the on-going operations. For example, when wiping a gauge stick as it is withdrawn from a receptacle, a rag may accidently fall into the receptacle, causing it to accumulate within the receptacle, which, in turn, may cause engine/system failure and/or malfunction in connection with operations, such as with extraction pumps, because the rag may clog the machinery, including various parts thereof. This increases overhead and financial costs as well—not only because precautions have to be taken to prevent such accidents but also because when such accidents do happen, actions must be taken to clear the clog so that operations can continue unimpeded.

Additionally, wiping a gauge stick with a rag can be a filthy task. During this process, residue/wetness from the gauge stick, the rag or both can come into contact with a user, such as a user's hands, and/or with the environment. Also, some residues can emit vapor, which also can come into contact with a user, be inhaled by a user and/or come into contact with the environment. Not only does this increase sanitation costs but it can also be dangerous, especially if the residue/wetness or its vapors is a hazardous material. If the residue/wetness or its vapors are hazardous to individuals or to the environment, special precautions must be taken. This, in turn, increase costs.

Moreover, because residue/wetness adheres to a gauge stick as the gauge stick is withdrawn from a receptacle, fluid is removed from the receptacle. The amount of fluid removed can be material—and even substantial—depending upon the length of the gauge stick and the amount of the surface area of the gauge stick that was submerged into the fluid. Thus, fluid is lost in the process. This loss of fluid is a cost as well. Instead of making use of that fluid, it is transferred to one or more rags and then discarded.

What is needed is an apparatus for removing wetness/residue from a gauge stick without the use of a rag or like material. More specifically, what is needed is an apparatus that wipes and removes wetness/residue from a gauge stick without a rag or like material while withdrawing the apparatus from a receptacle of fluid and that permits such removed wetness/residue to flow from the surface area of the gauge stick into the receptacle, thereby decreasing costs associated with the use of rags during the gauging process, decreasing the amount of fluid that is unnecessarily discarded during the gauging process and increasing safety to individuals and to the environment during the gauging process.

An apparatus for removing wetness from a gauge stick, having a plurality of embodiments disclosed herein, is a novel invention that meets the needs that are described in the aforementioned paragraphs, thus providing many substantial advantages and benefits such as, but not limited to, eliminating the filth associated with the use of rags, reducing costs—financial and otherwise—associated with the use of rags, reducing physical and gaseous contact between the wetness/residue on the gauge stick and individuals, decreasing the amount of fluid that is needlessly wasted and discarded during the gauging process when wetness/residue adheres to a gauge stick as it is withdrawn from a receptacle and increasing the safety to individuals and to the environment during the gauging process.

An embodiment of the present invention comprises a housing for receiving a gauge stick, a wiper receiver that is secured within the housing and a wiper that is fixed within the wiper receiver and that slidably engages with a gauge stick such that the wiper wipes/removes wetness/residue from the surface area of the gauge stick. The housing can comprise three separate members that fit together and are held together via screws or the like. Two of the members of the housing, namely, a right inlet member and a left inlet member, are identical in design such that when they are fitted together, a rectangular aperture forms within the interior of the housing, permitting a gauge stick to slide therethough. Both the right inlet member and the left inlet member can comprise a plurality of rail(s) to aid in guiding the gauge stick through the interior of the housing. Further, the exterior of the right inlet member and the exterior of the left inlet member are designed for easy gripping and holding when the two are fitted together to permit an individual to easily grip and hold the present invention during use. Also, the right inlet member and left inlet member each form a cavity for receiving and securing a third section of the housing, an outlet member. The third section of the housing, an outlet member, forms a cavity for receiving and securing the wiper receiver therein.

In utilizing an embodiment of the invention for its intended purpose, a gauge stick can be fed into the interior of the housing, specifically the aperture formed by the right inlet member and left inlet member when they are fitted together, and slid therethrough, passing through the aperture formed by the wiper and passing through the aperture formed from the outlet member, such that the gauge stick protrudes from the invention and into a receptacle. When the receptacle has been gauged, the linear movement of the gauge stick is reversed, and the gauge stick is moved in the opposite direction. The portion of the gauge stick that protrudes from the outlet member and into the receptacle is moved into the opposite direction, passing through the aperture formed from the outlet member, through the aperture formed by the wiper, through the aperture formed by the right inlet member and left inlet member when the right inlet member and left inlet member are fitted together and then finally disengaging from the invention.

When the gauge stick is moved in reverse, it slidably engages with the wiper, which causes wetness/residue on that portion of the surface area of the gauge stick to be wipe and removed. The removed wetness/residue is directed downward, through the aperture formed by the outlet member and into the receptacle. Thus, the gauge stick is squeegeed such that any wetness/residue that was on the surface of the gauge stick has been removed and directed into the receptacle.

While the present invention can be utilized in a variety of context and industries, its primary application is the petroleum industry. As such, embodiments of the present invention can be used in all facets of gauging fluids in connection with petroleum and similar fluids.

DETAILED DESCRIPTION

While the assembly of the present application is susceptible to various modifications and alternative forms, specific embodiments thereof are shown by way of example in the drawings and are herein described in detail. It should be understood, however, that the description herein of specific embodiments is not intended to limit the invention to the particular embodiment disclosed, but on the contrary, the intention is to cover all modifications, equivalents and alternatives falling within the spirit and scope of the present application.

Illustrative embodiments of the apparatus for removing wetness/residue from a gauge stick are provided below. It will, of course, be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, an illustration is shown that depicts an apparatus for removing wetness/residue from a gauge stick 100, which is an embodiment of the present invention. The apparatus 100 can include a left inlet member 110, a right inlet member 120 and an outlet member 130. The left inlet member 110, right inlet member 120 and outlet member 130 can comprise the housing of the apparatus 100, however persons of ordinary skill in this art should appreciate that different embodiments of the present invention may constitute members/parts that are comprised in different ways or fitted together differently to achieve the same or similar function as described herein.

When joined together, the left inlet member 110 and the right inlet 120 member form an inlet aperture at the top portion of the apparatus 100 that is capable of receiving a gauge stick. Notably, while the formation of the inlet aperture in FIG. 1 is depicted as a rectangle, the left inlet member 110 and the right inlet member 120 can be joined together to form any shape, thereby permitting the apparatus 100 to receive a gauge stick of any shape, whether rectangle or otherwise.

Figure 2:
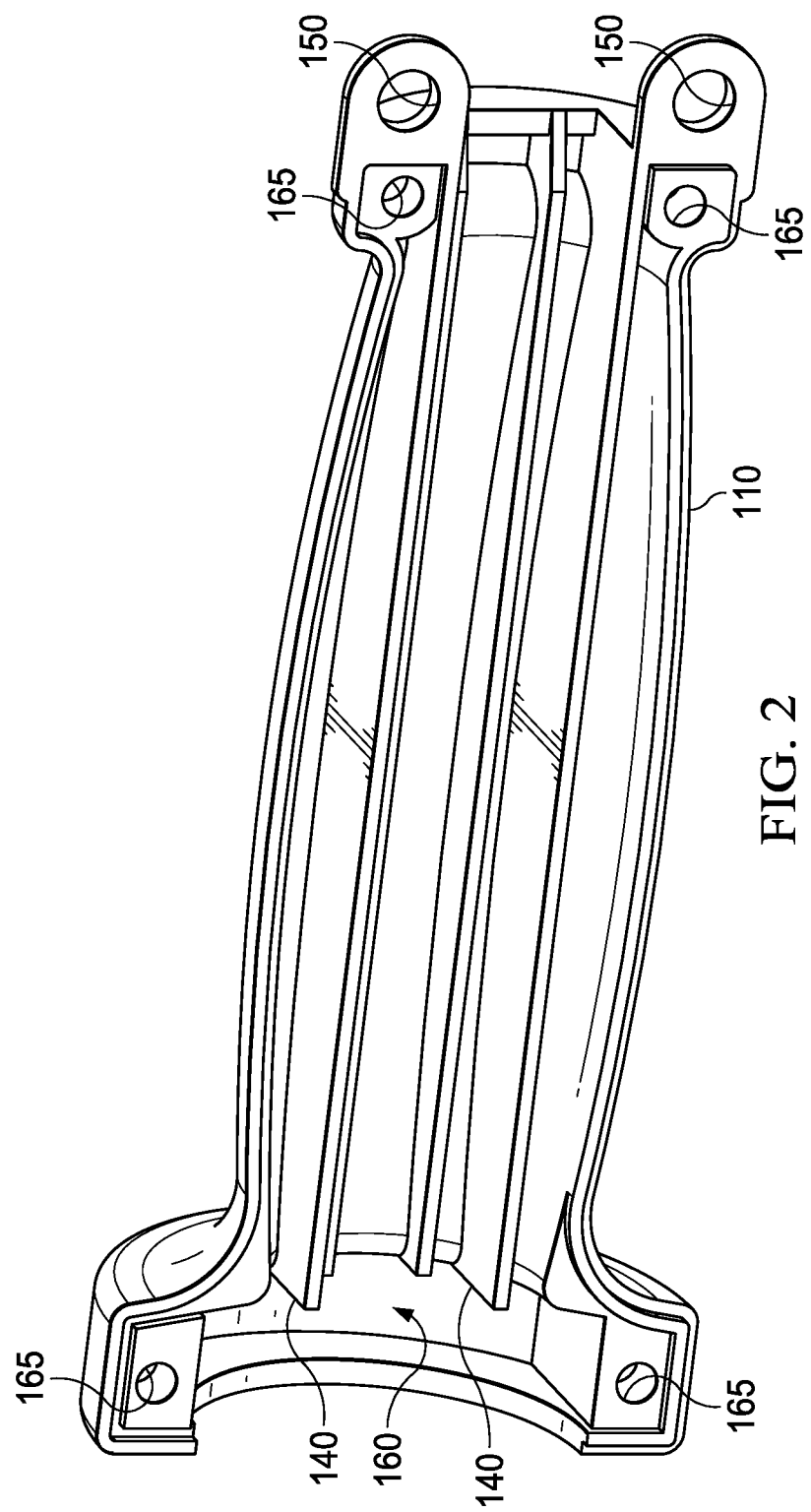
FIG. 2 is a perspective view of a left inlet member.

FIG. 2 depicts the left inlet member 110. The left inlet member 110 can comprise a plurality of rails 140 that extend lengthwise from the top portion to the bottom portion of the left inlet member 110 for guiding the gauge stick through the interior of the apparatus 100. Moreover, the top portion of the left inlet member 110 can form a plurality of eye apertures 150 for receiving and attaching a hook thereto from a lanyard. It may be beneficial to utilize a lanyard with the apparatus 100, so that the apparatus 100 can easily be place in a convenient location before and/or after use, such as around a person's arm, neck or hand.

The left inlet member 110 also can form a cavity 160 for receiving a portion of the outlet member 130. Additionally, the left inlet member 110 can form a plurality of screw apertures 165, thereby securing the housing together. However, artisans should appreciate that the housing as described in this embodiment can be secured together in a variety of ways, which are functionally equivalent to the use of screws.

Figure 3:
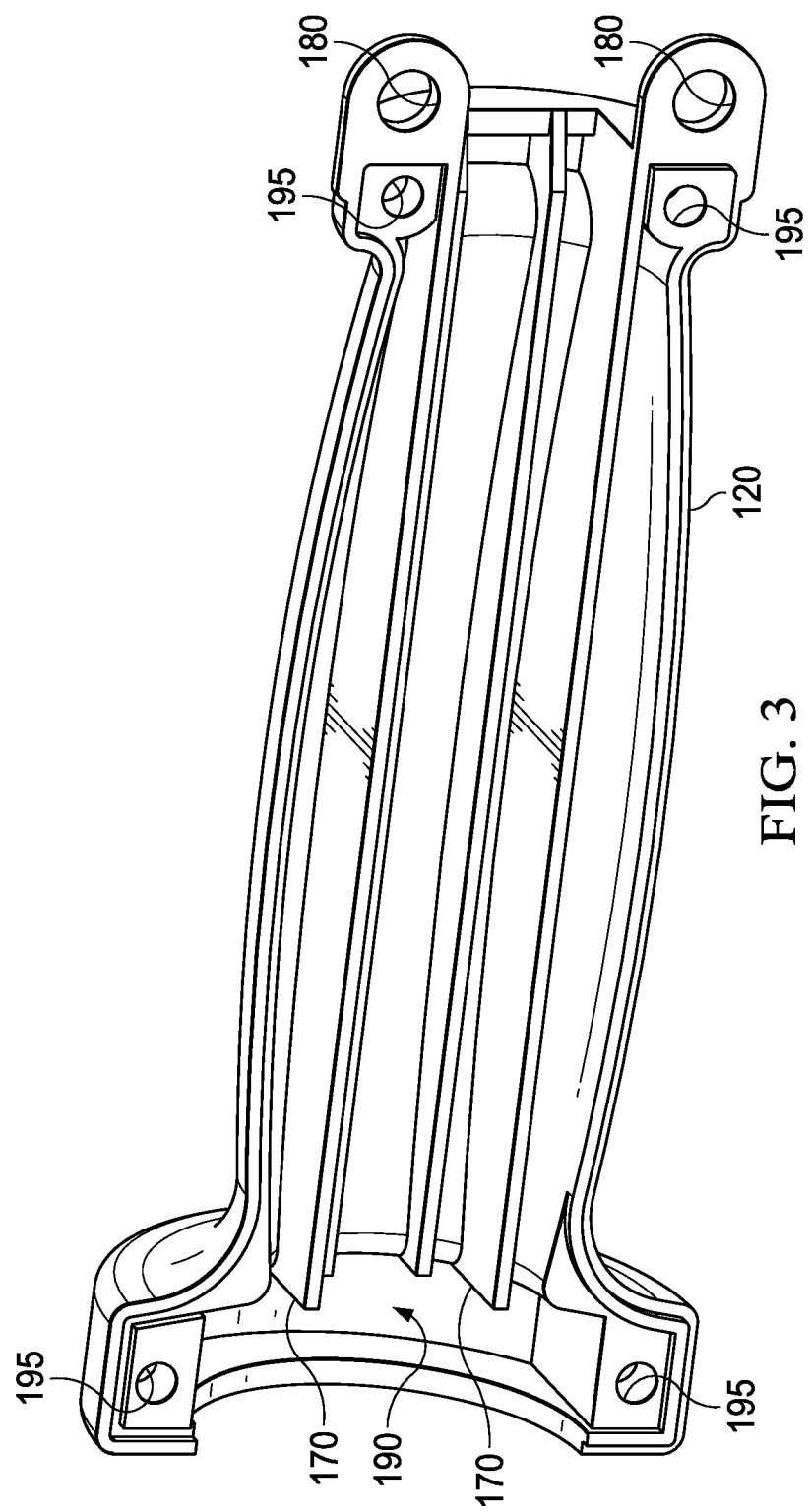
FIG. 3 is a perspective view of a right inlet member.

FIG. 3 depicts the right inlet member 120. The right inlet member 120 can comprise a plurality of rails 170 that extend lengthwise from the top portion to the bottom portion of the right inlet member 120 for guiding the gauge stick through the interior of the apparatus 100. Moreover, the top portion of the right inlet member 120 can form a plurality of eye apertures 180 for receiving and attaching a hook thereto from a lanyard.

The right inlet member 120 can also form a cavity 190 for receiving a portion of the outlet member 130. Additionally, the right inlet member 120 can form a plurality of screw apertures 195, thereby securing the housing together. However, artisans should appreciate that the housing as described in this embodiment can be secured together in a variety of ways, which are functionally equivalent to the use of screws. Further, it should be noted that the right inlet member 120 of FIG. 3 and the left inlet member 110 of FIG. 2 are identical in design, size and composition.

Figure 4:
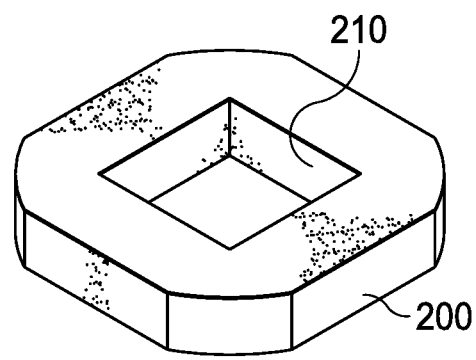
FIG. 4 is a perspective view of a wiper.

FIG. 4 depicts a wiper 200. The construction of the wiper 200 forms a wiper aperture 210 through which a gauge stick slidably engages. The wiper 200 can be made of rubber or any other material(s) that can adequately wipe and remove wetness/residue from the surface area of a gauge stick. Further, it should be noted that while the wiper 200 in an embodiment of the present invention as disclosed herein forms a wiper aperture 210 that is in the shape of a rectangle, a wiper aperture 210 of any shape or size may be formed—depending on the shape and size of the gauge stick —so that it is capable of receiving and slidably engaging with a gauge stick. The wiper 200 forms a wiper aperture 210 that fits the contours, shape and size of the gauge stick that passes through it.

Persons of ordinary skill in the art should appreciate that the wiper 200 is removable and interchangeable. Therefore, the apparatus 100 is designed to permit the wiper 200 to be removed and replaced at any time and as many times as necessary—but certainly after it has become worn due to use. As such, the apparatus 100 can be disassembled and reassemble in a quick and easy fashion to remove and replace the wiper 200. To disassemble the apparatus 100 so as to replace the wiper 200, loosen and remove the screw(s) that are located within the screw aperture(s) 165, 195, which are securing the housing of the apparatus 100 together. Once the members of the housing are separated, the wiper 200 can be replaced. To reassemble the apparatus 100, join the members of the housing together and then insert and tighten the screw(s) that are located within the screw aperture(s) 165, 195.

Figure 5:
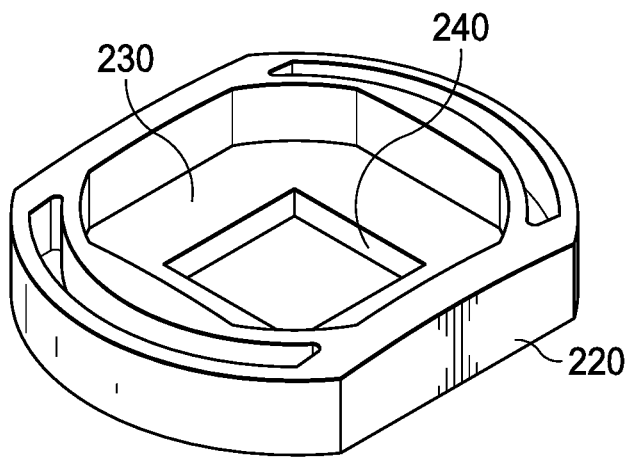
FIG. 5 is a perspective view of a wiper receiver.

FIG. 5 shows a wiper receiver 220, which forms a wiper receiver cavity 230 that is capable of receiving a wiper 200. A wiper 200 fits into the wiper receiver cavity 230 of the wiper receiver 220. Therefore, the exterior design of the construction of the wiper 200 must correspond to the contours of the wiper receiver cavity 230 formed by the wiper receiver 220. Further, in an embodiment of the present invention as discussed herein, the wiper receiver 220 forms a wiper receiver aperture 240 that is in the shape of a rectangle, however the wiper receiver 220 can form a wiper receiver aperture 240 of any shape or size that is capable of receiving a gauge stick and that corresponds to the wiper aperture 210 formed by the wiper 200. The wiper receiver 220 can be made of rubber or any other like material.

Figure 6:
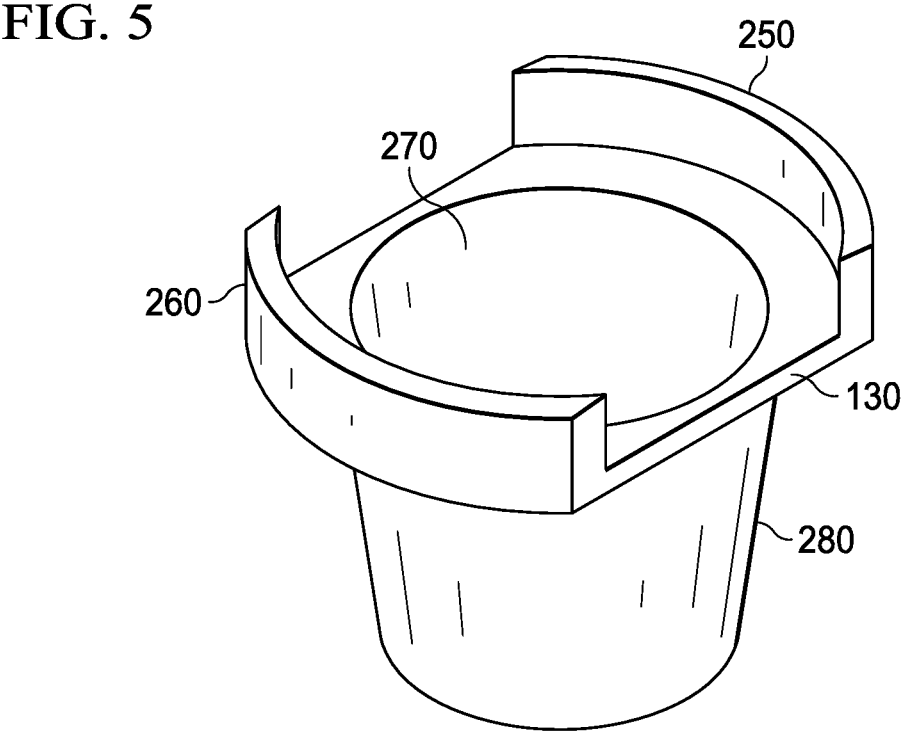
FIG. 6 is a perspective view of an outlet member.

FIG. 6 illustrates an outlet member 130. At its top portion, the outlet member 130 can comprise an outlet left shoulder 260 and an outlet right shoulder 250. The outlet left shoulder 260 fits into the cavity 160 formed by the left inlet member 110, and the outlet right shoulder 250 fits into the cavity 190 formed by the right inlet member 120. The outlet right shoulder 250 and the outlet left shoulder 260 form a cavity for receiving the wiper receiver 220. Further, the outlet member 130 forms an outlet aperture 270 capable of permitting a gauge stick to pass therethrough. At its bottom portion, the outlet member 130 can comprise a sleeve 280, which is tubular in shape and design, that can be tapered such that the diameter of the sleeve 280 decrease as the sleeve 280 extends downward. The sleeve 280 aids in channeling the wetness/residue from a gauge stick that is removed by the wiper 200 of the apparatus 100 to the receptacle from which the gauge stick was withdrawn. Also, the sleeve 280 aids in preventing any splashing or physical or gaseous contact between the wetness/residue that is removed from the gauge stick by the apparatus 100 and individuals and/or the environment.

FIG. 7 is an exploded perspective view of the apparatus 100, which is an embodiment of the present invention. As shown, a wiper 200 fits into the wiper receiver cavity 230 formed by a wiper receiver 220, and the wiper receiver 220 fits into the cavity of an outlet member 130 formed by an outlet right shoulder 250 and an outlet left shoulder 260. The outlet member 130 is secured to a left inlet member 110 and to a right inlet member 120, via one or more screws 290.

Figure 8A:
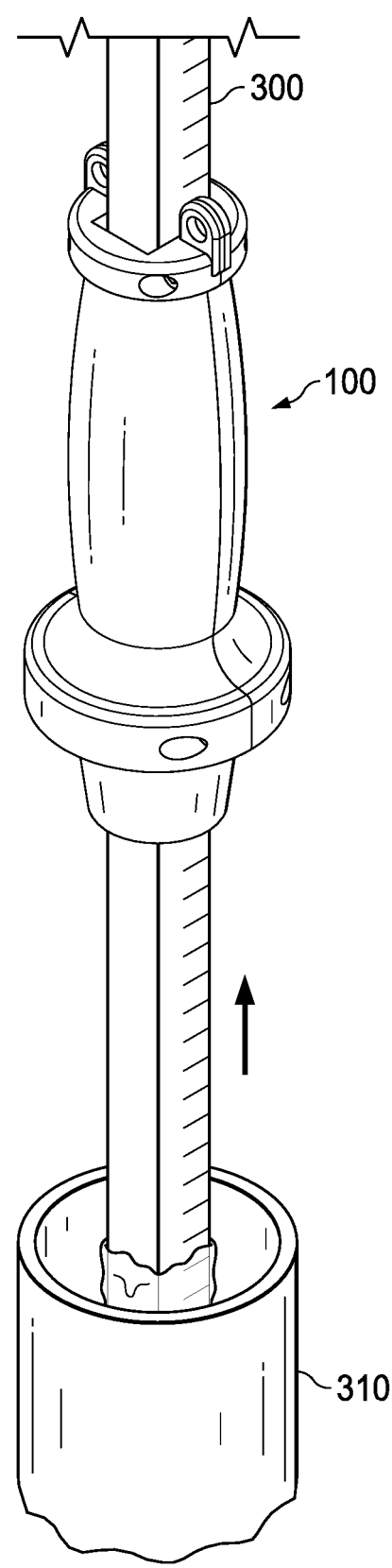
FIG. 8A is a perspective view of the apparatus of FIG. 1 that is in use such that a gauge stick is slidably engaging the apparatus and the gauge stick is withdrawing from a receptacle after fluid in the receptacle has been gauged.

FIG. 8A illustrates an apparatus 100 that is in use such that a gauge stick 300 is slidably engaging the apparatus 100, and the gauge stick 300 is in the initial process of withdrawing from a receptacle 310 after fluid in the receptacle 310 has been gauged. Thus, the gauge stick 300 is beginning its upward movement through the interior of the housing of the apparatus 100.

Figure 8B:
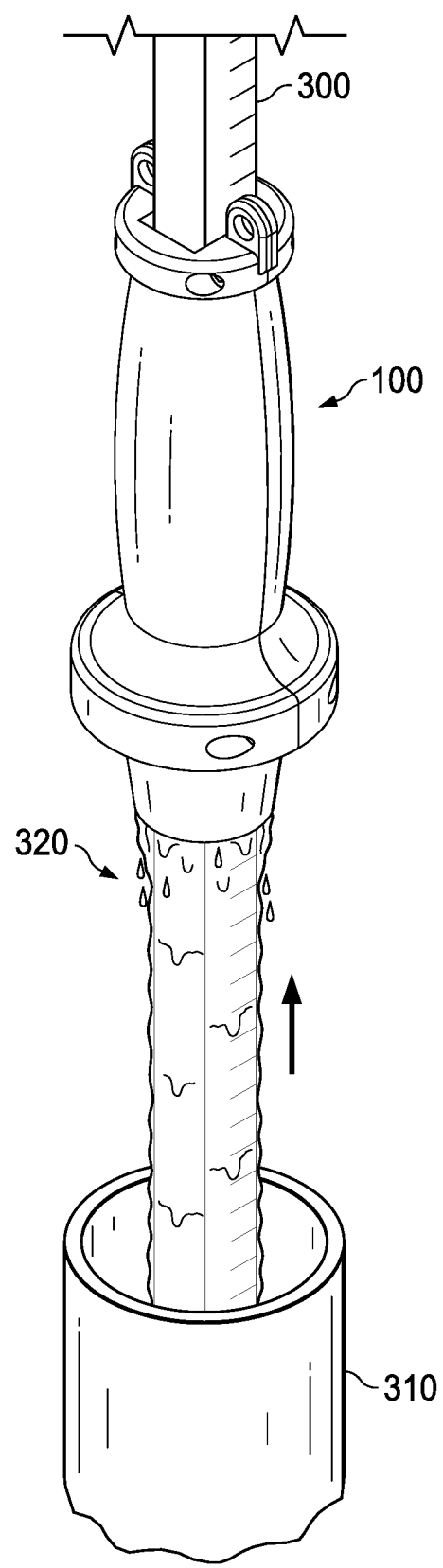
FIG. 8B is a perspective view of the apparatus of FIG. 1 that is in use such that the surface area of a gauge stick having wetness thereon is slidably engaging with the apparatus as the gauge stick is withdrawn from a receptacle, causing the wetness on the surface of the gauge stick to be wipe and removed from the gauge stick and returned to the receptacle.

FIG. 8B illustrates the apparatus 100 shown in FIG. 8A wherein the portion of the gauge stick 300 that was submerged in fluid inside the receptacle 310 and that comprises wetness/residue 320 thereon is being withdrawn from the receptacle 310 and is slidably engaging with the wiper 200 of the apparatus 100, which, in turn, is causing the wetness/residue 320 on the surface area of the gauge stick 300 that is slidably engaging with the wiper 200 to be wiped and removed therefrom and to be channeled downward into the receptacle 310. The downward channeling of the wetness/residue 320 by the apparatus 100 causes the wetness/residue 320 to flow in a downward direction and return to the inside of the receptacle 310. Thus, wetness/residue 320 is wiped/removed from the gauge stick 300 without a rag or similar material, thereby decreasing wasted fluid, reducing costs—financial and otherwise—and increasing safety to individuals and the environment.

It should be noted that herein the word wetness and the word residue have been used interchangeably, and it should be understood that each word encompasses the other in terms of its meaning as applied herein. Further it should be noted that the phrase gauge stick(s) as used herein also encompasses tank stick(s) and drum stick(s), among others.

The particular embodiments disclosed herein are illustrative only, as the embodiments may be modified and practiced in different but equivalent manners apparent to those skilled in the art having the benefit of the teachings herein. It is, therefore, evident that the particular embodiments disclosed herein may be altered or modified, and all such variations are considered within the scope and spirit of the present invention.

Although many embodiments of the present invention have been illustrated in the accompanying Drawings and described in the foregoing Detailed Description, it should be understood that the present invention is not limited to the embodiments disclosed, but is capable of numerous rearrangements, modifications, and substitutions of parts and elements without departing from the spirit of the invention.

What is claimed is:

1. An apparatus for removing wetness from a gauge stick, the apparatus comprising:
    a housing having a left inlet member, a right inlet member and an outlet member, the left inlet member having a plurality of rails that extend lengthwise from the top portion to the bottom portion thereof for guiding a gauge stick through the interior of the apparatus and forming a plurality of eye apertures at its top portion for receiving and attaching a hook from a lanyard, a cavity for receiving a portion of the outlet member and a plurality of screw apertures for securing the housing together, the right inlet member having a plurality of rails that extend lengthwise from the top portion to the bottom portion thereof for guiding a gauge stick through the interior of the apparatus and forming a plurality of eye apertures at its top portion for receiving and attaching a hook from a lanyard, a cavity for receiving a portion of the outlet member and a plurality of screw apertures for securing the housing together, the outlet member having an outlet left shoulder for engaging with the cavity formed by the left inlet member, an outlet right shoulder for engaging with the cavity formed by the right inlet member such that the left inlet member and the right inlet member form a cavity for receiving a wiper receiver and a sleeve for channeling the wetness that is removed from the gauge stick and forming an outlet aperture capable of permitting a gauge stick to pass therethrough;
    a wiper receiver that forms a wiper receiver cavity therein and that fits into the cavity of the outlet member that is formed by the outlet left shoulder and the outlet right shoulder; and
    a wiper that fits into the wiper receiver cavity formed by the wiper receiver and that forms a wiper aperture for slidably engaging a gauge stick.

2. The apparatus of claim 1 wherein the wiper is made of rubber.

3. The apparatus of claim 1 wherein the wiper receiver is made of rubber.

4. The apparatus of claim 1 wherein the wiper forms a wiper aperture in the shape of a rectangle.

5. The apparatus of claim 1 wherein the wiper receiver forms a wiper receiver aperture in the shape of a rectangle.

6. The apparatus of claim 1 wherein the wiper is interchangeable.

7. An apparatus for removing wetness from a gauge stick, the apparatus comprising:
    a left inlet member having a plurality of rails that extend lengthwise from the top portion to the bottom portion thereof for guiding a gauge stick through the interior of the apparatus and forming a plurality of eye apertures at its top portion for receiving and attaching a hook from a lanyard and a cavity at its bottom portion;
    a right inlet member having a plurality of rails that extend lengthwise from the top portion to the bottom portion thereof for guiding a gauge stick through the interior of the apparatus and forming a plurality of eye apertures at its top portion for receiving and attaching a hook from a lanyard and a cavity at its bottom portion;
    an outlet member having an outlet left shoulder for engaging with the cavity formed by the left inlet member, an outlet right shoulder for engaging with the cavity formed by the right inlet member and a sleeve for channeling the wetness that is removed from the gauge stick and forming an outlet aperture capable of permitting a gauge stick to pass therethrough;
    a wiper receiver that forms a wiper receiver cavity therein and that fits into the cavity of the outlet member that is formed by the outlet left shoulder and the outlet right shoulder; and
    a wiper that fits into the wiper receiver cavity formed by the wiper receiver and that forms a wiper aperture for slidably engaging a gauge stick.

8. The apparatus of claim 7 wherein the wiper is made of rubber.

9. The apparatus of claim 7 wherein the wiper receiver is made of rubber.

10. The apparatus of claim 7 wherein the wiper forms a wiper aperture in the shape of a rectangle.

11. The apparatus of claim 7 wherein the wiper receiver forms a wiper receiver aperture in the shape of a rectangle.

12. The apparatus of claim 7 wherein the wiper is interchangeable.

* * * * *